(12) United States Patent
Hao et al.

(10) Patent No.: US 8,441,915 B2
(45) Date of Patent: May 14, 2013

(54) METHOD AND A DEVICE FOR SEQUENCING THE ZC SEQUENCES OF THE RANDOM ACCESS CHANNEL

(75) Inventors: Peng Hao, Shenzhen (CN); Shuqiang Xia, Shenzhen (CN); Gang Tian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 537 days.

(21) Appl. No.: 12/672,580

(22) PCT Filed: Dec. 27, 2007

(86) PCT No.: PCT/CN2007/003846
§ 371 (c)(1),
(2), (4) Date: Feb. 8, 2010

(87) PCT Pub. No.: WO2009/021375
PCT Pub. Date: Feb. 19, 2009

(65) Prior Publication Data
US 2012/0069933 A1    Mar. 22, 2012

(30) Foreign Application Priority Data
Aug. 10, 2007 (CN) .......................... 2007 1 0135732

(51) Int. Cl.
*H04J 11/00* (2006.01)
(52) U.S. Cl.
USPC ........... 370/208; 370/336; 370/328; 370/252; 375/308; 375/295; 375/260
(58) Field of Classification Search .................. 370/252, 370/344, 208, 336, 338, 328, 329; 375/308, 375/295, 150, 260
See application file for complete search history.

(56) References Cited

U.S. PATENT DOCUMENTS

| | | | |
|---|---|---|---|
| 2006/0050799 A1 | 3/2006 | Hou et al. | |
| 2007/0183386 A1 | 8/2007 | Muharemovic et al. | |
| 2007/0230600 A1* | 10/2007 | Bertrand et al. | 375/260 |
| 2008/0139237 A1* | 6/2008 | Papasakellariou | 455/522 |
| 2008/0235314 A1* | 9/2008 | Lee et al. | 708/426 |
| 2008/0267137 A1* | 10/2008 | Dabak et al. | 370/336 |
| 2009/0046629 A1* | 2/2009 | Jiang et al. | 370/328 |

OTHER PUBLICATIONS

International Search Report for PCT Patent Application PCT/CN2007/003846 dated May 22, 2008.

* cited by examiner

*Primary Examiner* — Ricky Ngo
*Assistant Examiner* — Rasheed Gidado
(74) *Attorney, Agent, or Firm* — Christopher L. Parmelee; Walker & Jocke (57) ABSTRACT

The present invention discloses a method and a device for sequencing the ZC sequences of the random access channel. The method for sequencing the ZC sequences includes the following steps: Step 202, ZC sequences are divided into a plurality of groups according to the cubic metrics of the ZC sequences; Step 204, the ZC sequences are sequenced, according to the maximum cyclic shift supported by the ZC sequences under a high speed circumstance, within each group to form a plurality of sub-groups; and Step 206, the ZC sequences within each of the plurality of sub-groups are sequenced according to the cubic metrics of the ZC sequences, wherein, the adjacent sub-groups in the same group are sequenced in different orders, while the sub-groups at the boundary of the two adjacent groups are sequenced in the same order. Thereby, the sequences could be assigned according to the CMs, and the sequence fragments could be collected for use.

18 Claims, 7 Drawing Sheets

METHOD AND A DEVICE FOR SEQUENCING THE ZC SEQUENCES OF THE RANDOM ACCESS CHANNEL

FIELD OF THE INVENTION

The present invention relates to communication field, in particular to a method and a device for sequencing the ZC sequences of the random access channel.

BACKGROUND OF THE INVENTION

In Long Term Evolution (LTE for short) system, cyclic shift sequences of Zadoff-Chu (ZC for short) sequences are used as preambles by the Random Access Channel (RACH for short). These cyclic shift sequences are also referred to as Zero Correlation Zone (ZCZ for short) sequences.

In practical systems, after a mobile phone is powered on, firstly, downlink synchronization is first performed, and then the detection of the Broadcast Channel (BCH for short) is initiated. A base station informs, via the BCH channel, the mobile phone the index and the step length of the cyclic shift of the first ZC sequence available for the RACH of the current cell. According to the index, the mobile phone makes use of certain mapping rule to calculate the serial number of the corresponding ZC sequence, and then, generates usable ZCZ sequences according to the step length of the cyclic shift and a certain "cyclic shift limitation rule". If the number of the ZCZ sequences is smaller than a certain threshold P, the mobile phone automatically increments the sequence index, and continuously generates the ZCZ sequences using the next ZC sequence, until the total number of the ZCZ sequences is larger than or equal to P. Finally, the mobile phone randomly selects one sequence from all the generated usable ZCZ sequences as a preamble to be sent.

In a high speed circumstance, the frequency offset caused by Doppler Effect will generate, during the process of the preamble detection, a correlation peak alias, which will lead to a timing offset and a false detection. This problem is settled in LTE system through limiting the use of some cyclic shifts according to a certain rule, which is the mentioned "cyclic shift limitation rule". Meanwhile, the cyclic shift limitation rule also limits the maximum cyclic shift $N_{CS}$ corresponding to each ZC sequence, and this maximum cyclic shift directly determines the maximum cell radius supported by each ZC sequence. Supposing that the distance between the correlation peak and the correlation peak alias thereof is du, the relation between the maximum cyclic shift $N_{CS}$ and du is:

$$N_{CS} = \min(du, N_{ZC} - 2 \cdot du) \quad (1)$$

wherein, $N_{ZC}$ is the length of a ZC sequence, du can be calculated by the following formula:

$$du = \begin{cases} \dfrac{m \cdot N_{ZC} - 1}{u}, & \text{when } \dfrac{m \cdot N_{ZC} - 1}{u} \leq \text{floor}(N/2) \\ N_{ZC} - \dfrac{m \cdot N_{ZC} - 1}{u}, & \text{when } \dfrac{m \cdot N_{ZC} - 1}{u} > \text{floor}(N/2) \end{cases} \quad (2)$$

wherein, u is the serial number of the ZC sequence, and m is the minimum positive integer which makes $$\dfrac{m \cdot N_{ZC} - 1}{u}$$

a positive integer.

Figure 1:
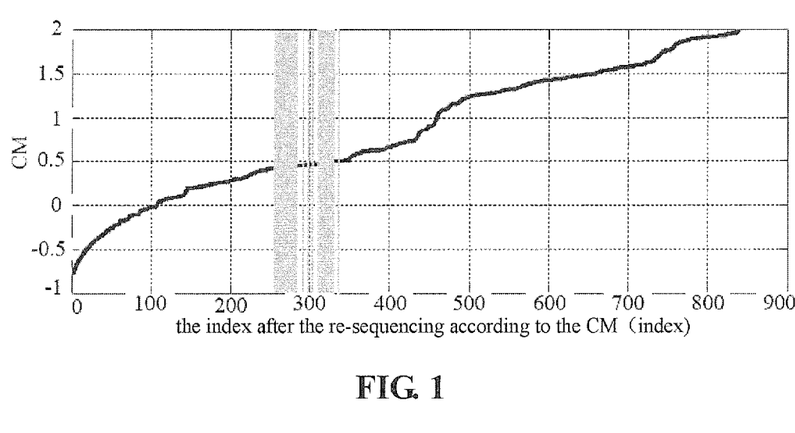
FIG. 1 is a schematic diagram of the generation of the sequence fragments in relevant techniques.

The mapping process between the indices and the serial numbers of the ZC sequences is actually the process of re-sequencing the ZC sequences. At present, there are mainly two sequencing methods: one is to sequence according to the cubic metric (CM for short, it is a standard for measuring the Peak-to-Average Power Ratio of the emitted data, the larger the CM is, the higher the Peak-to-Average Power Ratio is) of the ZC sequences, and the other is to sequence according to the maximum cell radius supported by each ZC sequence. The first method is advantageous in that network planning can be conveniently performed according to the CM of a root sequence so as to assign the sequences with smaller CMs to the cells with larger radius, and the sequences with close CMs to the same cell. Its shortcoming lies in that sequence fragments will be generated, which will cause the waste of the sequences. In other words, during the process of generating the ZCZ sequences with the continuous incrementation of the sequence index, if the maximum cell radius supported by a ZC sequence is smaller than the radius of the current cell, this sequence neither could be used by the current cell, nor it could be used by other cells having radiuses smaller than the maximum cell radius supported by this ZC sequence (this is because that the index is continuously incremental, as shown in FIG. 1). The second method is advantageous in avoiding the generation of the sequence fragments, that is disadvantageous in that the CMs of the ZC sequences assigned to a cell differs greatly from each other so that sequence planning can not be performed according to the CM.

SUMMARY OF THE INVENTION

In view of the above mentioned one or more problem, the present invention provides a method and a device for sequencing the ZC sequences of the random access channel.

The method for sequencing the ZC sequences of the random access channel according to the embodiments of the present invention comprises the following steps: Step 202, Nq ZC sequences are divided into a plurality of groups according to the cubic metrics of the ZC sequences; Step 204, the ZC sequences are sequenced, according to the maximum cyclic shift supported by the ZC sequences under a high speed circumstance, within each group to form a plurality of sub-groups; and Step 206, the ZC sequences are sequenced within each of the plurality of sub-groups according to the cubic metrics of the ZC sequences, wherein, the adjacent sub-groups in the same group are sequenced in different orders, while the sub-groups at the boundary of the two adjacent groups are sequenced in the same order.

Wherein, in Step 202, Nq ZC sequences are divided into G groups, wherein, $1 \leq G \leq Nq$, the relation between the serial number of each of the plurality of groups and the cubic metrics of the ZC sequences in each of the plurality of groups is: the cubic metrics of the ZC sequences in Group i are smaller than the cubic metrics of the ZC sequences in Group i+1, or the cubic metrics of the ZC sequences in Group i are larger than the cubic metrics of the ZC sequences in Group i+1. Specifically, Nq ZC sequences may be divided into two groups according to the cubic metrics of Quadrature Phase Shift Keying.

Wherein, in Step 202, firstly, Nq ZC sequences are sequenced, in the decreasing order or in the increasing order, according to the cubic metrics of the ZC sequences, and then, the sequencing result is divided into a plurality of groups according to one or more cyclic shift thresholds.

Wherein, the sequencing process in Step 204 may be performed in the increasing order or in the decreasing order, and the adjacent groups are sequenced in different orders.

Wherein, the sequencing process in Step 204 needs to be performed according to a certain granularity. The granularity of the cyclic shift of Group g is $P^g=\{P_1^g, P_2^g, \ldots, P_s^g\}$, and $P_i^g < P_{i+1}^g$, thus, (1) the sequencing performed in the increasing order means: when $1<i<s$, the maximum cyclic shift supported by each sequence in Sub-group i under the high speed circumstance is smaller than $P_{i+1}^g$, and larger than or equal to $P_i^g$, when i=1, the maximum cyclic shift supported by each sequence in Sub-group i under the high speed circumstance is smaller than $P_1^g$, when i=s, the maximum cyclic shift supported by each sequence in Sub-group i under the high speed circumstance is larger than or equal to $P_s^g$; (2) the sequencing performed in the decreasing order means: when $1<i<s$, the maximum cyclic shift supported by each sequence in Sub-group i under the high speed circumstance is smaller than $P_{s-i+2}^g$ and larger than or equal to $P_{s-i+1}^g$, when i=1, the maximum cyclic shift supported by each sequence in Sub-group i under the high speed circumstance is larger than or equal to $P_s^g$, when i=s, the maximum cyclic shift supported by each sequence in Sub-group i under the high speed circumstance is smaller than $P_i^g$.

Wherein, the maximum cyclic shift $N_{CS}=\min(du, N_{ZC}-2\cdot du)$, wherein, du is the distance between a correlation peak and a correlation peak alias thereof, and $N_{ZC}$ is the length of the ZC sequence. The distance between the correlation peak and the correlation peak alias thereof is $$du = \begin{cases} \frac{m \cdot N_{ZC} - 1}{u}, & \text{when } \frac{m \cdot N_{ZC} - 1}{u} \leq \text{floor}(N/2) \\ N_{ZC} - \frac{m \cdot N_{ZC} - 1}{u}, & \text{when } \frac{m \cdot N_{ZC} - 1}{u} > \text{floor}(N/2) \end{cases},$$

wherein, u is the serial number of the ZC sequence, and m is the minimum positive integer which makes $$\frac{m \cdot N_{ZC} - 1}{u}$$

a positive integer.

The device for sequencing the ZC sequences of the random access channel according to the embodiments of the present invention comprises: a first group dividing unit, configured to divide Nq ZC sequences into a plurality of groups according to the cubic metrics of the ZC sequences of the random access channel; a to second group dividing unit, configured to sequence the ZC sequences within each group to form a plurality of sub-groups, according to the maximum cyclic shift supported by the ZC sequences under a high speed circumstance; and a sequencing unit, configured to sequence the ZC sequences in each of the plurality of sub-groups according to the cubic metrics of the ZC sequences, wherein, the adjacent sub-groups in the same group are sequenced in different orders, while the sub-groups at the boundary of the two adjacent groups are sequenced in the same order.

Wherein, the first group dividing unit divides Nq ZC sequences into G groups, wherein, $1 \leq G \leq Nq$, the relation between the serial number of each of the plurality of groups and the cubic metrics of the ZC sequences in each of the plurality of group is: the cubic metrics of the ZC sequences in Group i are smaller than the cubic metrics of the ZC sequences in Group i+1, or the cubic metrics of the ZC sequences in Group i are larger than the cubic metrics of the ZC sequences in Group i+1. Specifically, the first group dividing unit divides the Nq ZC sequences into two groups using the cubic metrics of Quadrature Phase Shift Keying as a threshold.

Wherein, the second group dividing unit divides the ZC sequences in each sub-group into a plurality of sub-groups according to one of the following principles: the maximum cyclic shift supported by the ZC sequences in Sub-group i under the high speed circumstance is smaller than the maximum cyclic shift supported by the ZC sequences in Sub-group i+1 under the high speed circumstance, the maximum cyclic shift supported by the ZC sequences in Sub-group i under the high speed circumstance is larger than the maximum cyclic shift supported by the ZC sequences in Sub-group i+1 under the high speed circumstance, wherein, the second group dividing unit applies different principles to the sub-groups in adjacent groups.

Wherein, the sequencing process of the second group dividing unit may be performed in the increasing order or in the decreasing order, and the adjacent groups should be sequenced in different orders.

Wherein, the sequencing process of the second group dividing unit needs to be performed according to a certain granularity. The granularity of the cyclic shift of Group g is $P^g=\{P_1^g, P_2^g, \ldots, P_s^g\}$, and $P_i^g < P_{i+1}^g$, thus, (1) performing the sequencing in the increasing order means: when $1<i<s$, the maximum cyclic shift supported by each sequence in Sub-group i under the high speed circumstance is smaller than $P_{i+1}^g$, and larger than or equal to $P_i^g$, when i=1, the maximum cyclic shift supported by each sequence in Sub-group i under the high speed circumstance is smaller than $P_1^g$, when i=s, the maximum cyclic shift supported by each sequence in Sub-group i under the high speed circumstance is larger than or equal to $P_s^g$; (2) performing the sequencing in the decreasing order means: when $1<i<s$, the maximum cyclic shift supported by each sequence in Sub-group i under the high speed circumstance is smaller than $P^{s-i+2g}$, and larger than or equal to $P_{s-i+1}^g$, when i=1, the maximum cyclic shift supported by each sequence in Sub-group i under the high speed circumstance is larger than or equal to $P_s^g$, when i=s, the maximum cyclic shift supported by each sequence in Sub-group i under the high speed circumstance is smaller than $P_1^g$.

Wherein, the maximum cyclic shift $N_{CS}=\min(du, N_{ZC}-2\cdot du)$, wherein, du is the distance between a correlation peak and a correlation peak alias thereof, and $N_{ZC}$ is the length of the ZC sequence. The distance between the correlation peak and the correlation peak alias thereof is $$du = \begin{cases} \frac{m \cdot N_{ZC} - 1}{u}, & \text{when } \frac{m \cdot N_{ZC} - 1}{u} \leq \text{floor}(N/2) \\ N_{ZC} - \frac{m \cdot N_{ZC} - 1}{u}, & \text{when } \frac{m \cdot N_{ZC} - 1}{u} > \text{floor}(N/2) \end{cases},$$

wherein, u is the serial number of the ZC sequence, and m is the minimum positive integer which makes $$\frac{m \cdot N_{ZC} - 1}{u}$$

a positive integer.

The present invention not only enables the assignment of the sequences according to the CMs, but also enables the collection of the sequence fragments for use, so that the generation of sequence fragments can be avoided. Meanwhile, the present invention is fully compatible to the first and the second re-sequencing methods described in the Background of the Invention, without introducing any extra signaling cost.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF THE EMBODIMENTS

The embodiments of the present invention will be described hereinafter in detail in conjunction with the drawings thereof.

Figure 2:
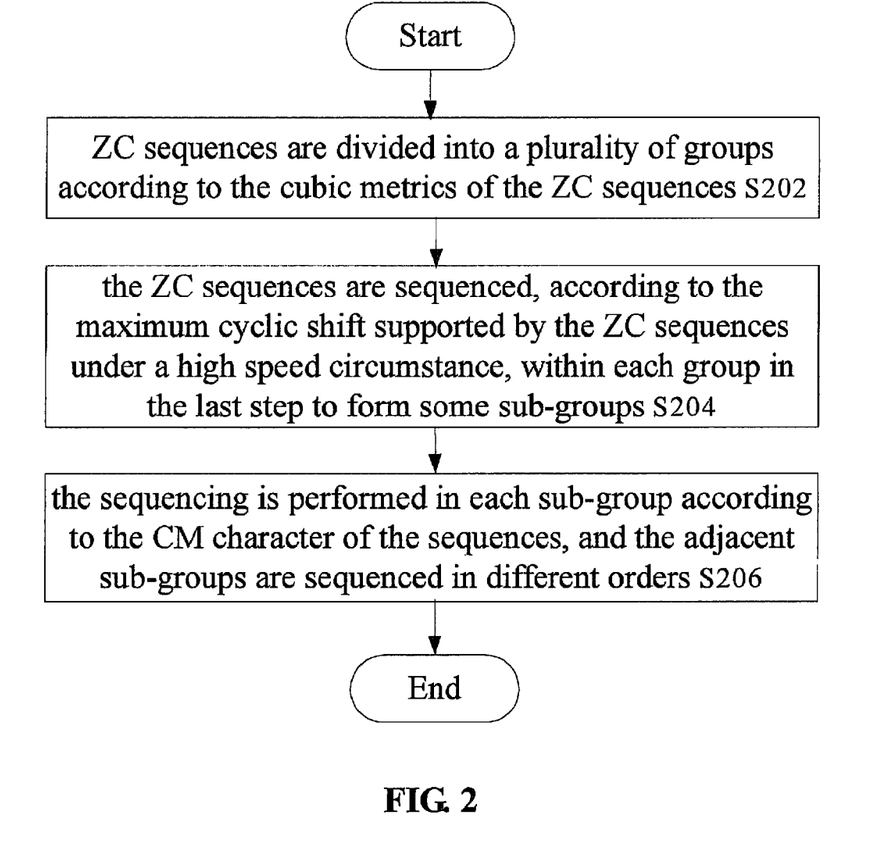
FIG. 2 is a flowchart of the method for sequencing the ZC sequences of the random access channel according to the embodiments of the present invention.

The method for sequencing the ZC sequences of the random access channel according to an embodiment of the present invention is described with reference to FIG. 2. As shown in FIG. 2, the method for sequencing the ZC sequences comprises the following steps:

Step 202, the ZC sequences are divided into a plurality of groups according to the cubic metrics of the ZC sequences. Specifically, there are various principles for the group division. For example, the CM of data modulated using Quadrature Phase Shift Keying (QPSK for short) is 1.2 dB, and this value can be used as a threshold to divide the ZC sequences into two groups: the CMs of the ZC sequences in the first group is smaller than or equal to 1.2 dB; and the CMs of the ZC sequences in the second group is larger than 1.2 dB. Wherein, the following method can be used to carry out this step: sequencing the cubic metrics of the ZC sequences in the increasing order; and dividing the sequencing result into two groups using the cubic metric (1.2 dB) of QPSK as a threshold.

Step 204, the ZC sequences are sequenced, according to the maximum cyclic shift supported by the ZC sequences under a high speed circumstance, within each group to form a plurality of sub-groups. The sequencing process may be performed in the increasing order or in the decreasing order, and the adjacent groups (the groups obtained through Step 202) shall be sequenced in different orders. Moreover, the sequencing process needs to be performed according to a certain granularity. The granularity of the cyclic shift of Group g is $P^g = \{P_1^g, P_2^g, \ldots, P_s^g\}$, and $P_i^g < P_{i+1}^g$, thus, (1) the sequencing performed in the increasing order means: when $1<i<s$, the maximum cyclic shift supported by each sequence in Sub-group i under the high speed circumstance is smaller than $P_{i+1}^g$, and larger than or equal to $P_i^g$, when $i=1$, the maximum cyclic shift supported by each sequence in Sub-group i under the high speed circumstance is smaller than $P_1^g$, when $i=s$, the maximum cyclic shift supported by each sequence in Sub-group i under the high speed circumstance is larger than or equal to $P_s^g$; (2) the sequencing performed in the decreasing order means: when $1<i<s$, the maximum cyclic shift supported by each sequence in Sub-group i under the high speed circumstance is smaller than $P_{s-i+2}^g$ and larger than or equal to $P_{s-i+1}^g$, when $i=1$, the maximum cyclic shift supported by each sequence in Sub-group i under the high speed circumstance is larger than or equal to $P_s^g$, when $i=s$, the maximum cyclic shift supported by each sequence in Sub-group i under the high speed circumstance is smaller than $P_1^g$.

Step 206, in each sub-group, the sequencing is performed according to the CM values of the ZC sequences, and the adjacent sub-groups in the same group are sequenced in different orders, while the sub-groups at the boundary of the two adjacent groups are sequenced in the same order.

Wherein, since performing the sequencing according to the maximum cell radius supported by the ZC sequences only needs to know the relative relation between the maximum cell radiuses supported by respective ZC sequences, and since the maximum cell radius supported by each ZC sequence is directly determined by the maximum cyclic shift $N_{CS}$ of each ZC sequence, the sequencing process is equivalent to performing a sequencing according to $N_{CS}$. Wherein, $N_{CS} = \min(du, N_{ZC} - 2 \cdot du)$, du is the distance between the correlation peak and the correlation peak alias thereof, and $N_{ZC}$ is the length of a ZC sequence. The distance between the correlation peak and the correlation peak alias thereof is $$du = \begin{cases} \frac{m \cdot N_{ZC} - 1}{u}, & \text{when } \frac{m \cdot N_{ZC} - 1}{u} \leq \text{floor}(N/2) \\ N_{ZC} - \frac{m \cdot N_{ZC} - 1}{u}, & \text{when } \frac{m \cdot N_{ZC} - 1}{u} > \text{floor}(N/2) \end{cases},$$

wherein, u is the serial number of the ZC sequence, and m is the minimum positive integer which makes $$\frac{m \cdot N_{ZC} - 1}{u}$$

a positive integer.

Figure 3:
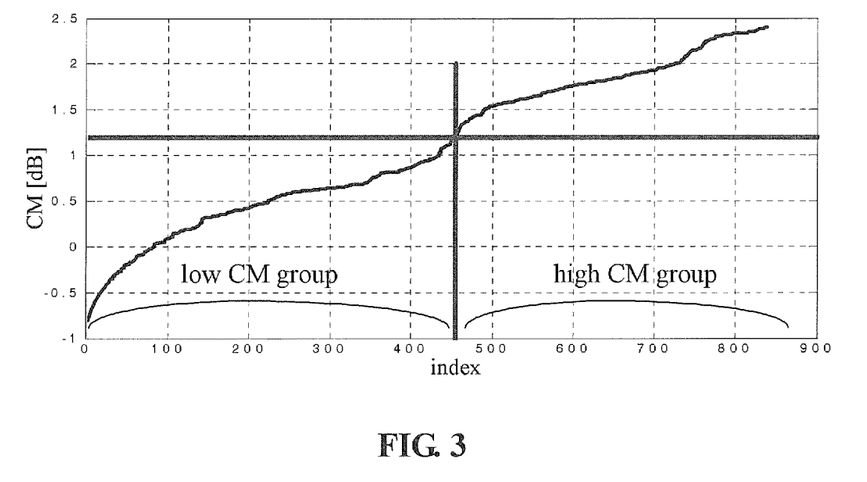
FIG. 3 is a schematic diagram of Step 202 in the method illustrated in FIG. 2.
Figure 4:
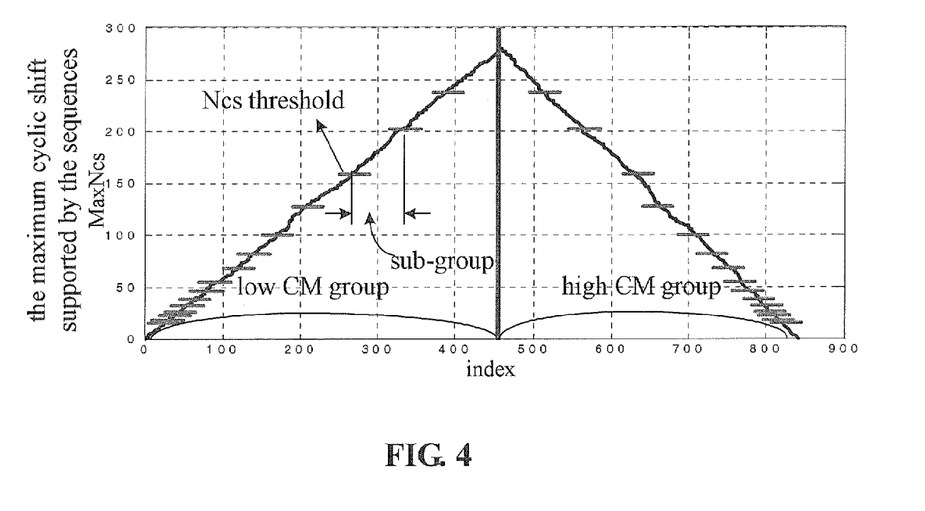
FIG. 4 is a schematic diagram of Step 204 in the method illustrated in FIG. 2.
Figure 5:
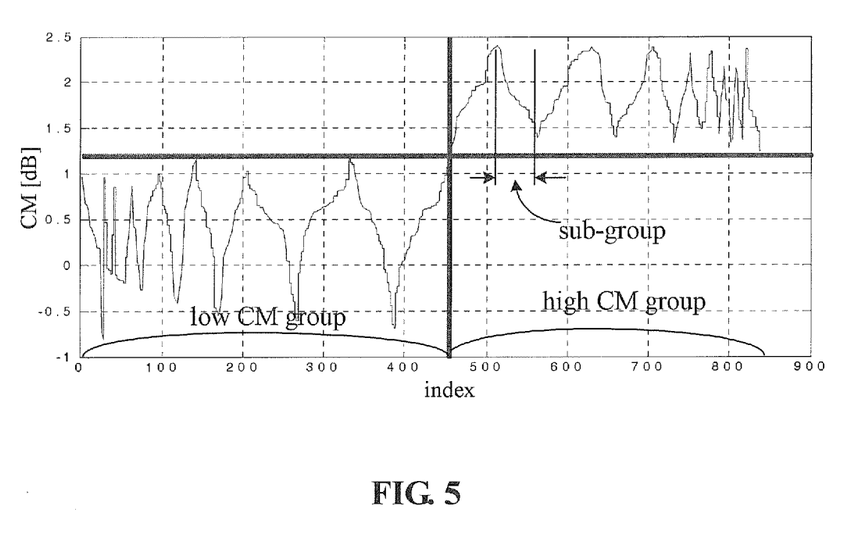
FIG. 5 is a schematic diagram of Step 206 in the method illustrated in FIG. 2 (in view of the cubic metric)
Figure 6:
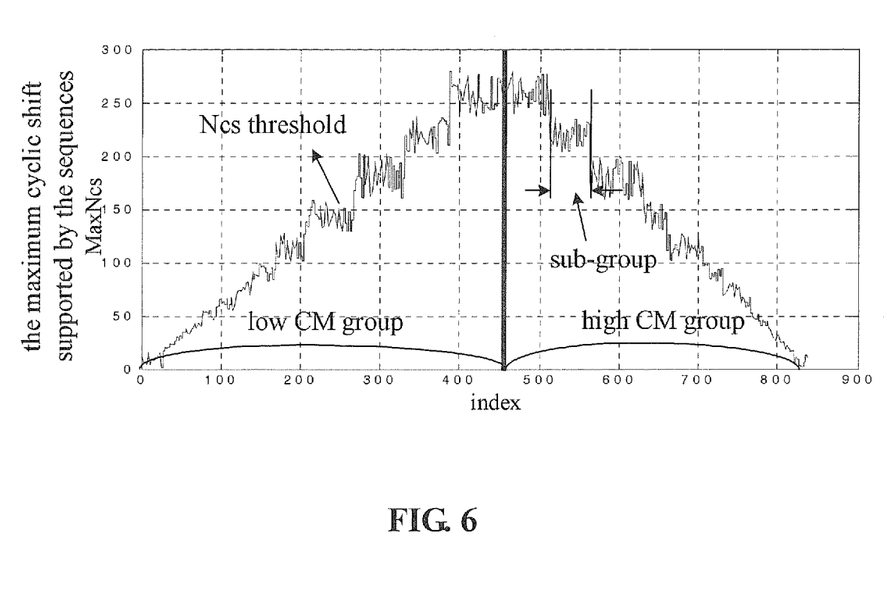
FIG. 6 is a schematic diagram of Step 206 in the method illustrated in FIG. 2 (in view of the maximum cyclic shift supported by the ZC sequences)

For example, the length $N_{ZC}$ of the ZC sequence is 839, and each cell needs to generate 64 usable ZCZ sequences. Firstly, the ZC sequences are divided into two groups according to the CM value (1.2 dB) of the QPSK, wherein, the CM value of the first group is smaller than 1.2 dB, and the CM value of the second group is larger than 1.2 dB (as shown in FIG. 3); secondly, the sequencing is performed according to the granularity {15, 18, 22, 26, 32, 38, 46, 55, 68, 82, 100, 128, 158, 202, 237}, and according to the maximum cyclic shift supported by the ZC sequences under the high speed circumstance, and the sequencing is performed in the increasing order in the low CM group, while in the decreasing order in the high CM group, and the ZC sequences are divided into 16 sub-groups in each group (as shown in FIG. 4); finally, the sequencing is performed in each sub-group according to the CMs of the sequences, and the adjacent sub-groups are sequenced in different orders (as shown in FIGS. 5 and 6). The sequencing result is shown in table 1

TABLE 1

| SG1 | SG2 | SG3 | SG4 | SG5 | SG6 | SG7 | SG8 | SG9 | SG10 | SG11 | SG12 | SG13 | SG14 | SG15 | SG16 |
|---|---|---|---|---|---|---|---|---|---|---|---|---|---|---|---|
| low cubic metric group ||||||||||||||||
| 129 | 56 | 80 | 35 | 808 | 24 | 86 | 744 | 217 | 12 | 228 | 832 | 687 | 5 | 225 | 3 |
| 710 | 783 | 759 | 804 | 31 | 815 | 753 | 95 | 622 | 827 | 611 | 7 | 152 | 834 | 614 | 836 |
| 140 | 112 | 42 | 766 | 811 | 791 | 761 | 202 | 128 | 816 | 227 | 831 | 144 | 806 | 615 | 820 |
| 699 | 727 | 797 | 73 | 28 | 48 | 78 | 637 | 711 | 23 | 612 | 8 | 695 | 33 | 224 | 19 |
| 719 | 148 | 40 | 693 | 30 | 771 | 796 | 649 | 697 | 34 | 132 | 823 | 134 | 788 | 618 | 817 |
| 120 | 691 | 799 | 146 | 809 | 68 | 43 | 190 | 142 | 805 | 707 | 16 | 705 | 51 | 221 | 22 |
| 629 | | | | 812 | 74 | 39 | 658 | 122 | 37 | 706 | 792 | 138 | 764 | 220 | 798 |
| 210 | | | | 27 | 765 | 800 | 181 | 717 | 802 | 133 | 47 | 701 | 75 | 619 | 41 |
| 168 | | | | 29 | 661 | 819 | 702 | 203 | 793 | 143 | 64 | 640 | 740 | 127 | 38 |
| 671 | | | | 810 | 178 | 20 | 137 | 636 | 46 | 696 | 775 | 199 | 99 | 712 | 801 |
| 84 | | | | | 703 | 818 | 125 | 721 | 207 | 704 | 57 | 162 | 743 | 147 | 44 |
| 755 | | | | | 136 | 21 | 714 | 118 | 632 | 135 | 782 | 677 | 96 | 692 | 795 |
| 105 | | | | | | | 151 | 729 | 660 | 161 | 735 | 176 | 97 | 124 | 52 |
| 734 | | | | | | | 688 | 110 | 179 | 678 | 104 | 663 | 742 | 715 | 787 |
| 746 | | | | | | | | 89 | 694 | 201 | 101 | 119 | 166 | 193 | 45 |
| 93 | | | | | | | | 750 | 145 | 638 | 738 | 720 | 673 | 646 | 794 |
| 70 | | | | | | | | 736 | 709 | 666 | 108 | 681 | 172 | 205 | 63 |
| 769 | | | | | | | | 103 | 130 | 173 | 731 | 158 | 667 | 634 | 776 |
| 779 | | | | | | | | 61 | 223 | 733 | 631 | 164 | 664 | 633 | 772 |
| 60 | | | | | | | | 778 | 616 | 106 | 208 | 675 | 175 | 206 | 67 |
| 2 | | | | | | | | 784 | | 756 | 655 | 665 | 652 | 723 | 72 |
| 837 | | | | | | | | 55 | | 83 | 184 | 174 | 187 | 116 | 767 |
| 1 | | | | | | | | 824 | | 748 | 197 | 668 | 676 | 679 | 76 |
| 838 | | | | | | | | 15 | | 91 | 642 | 171 | 163 | 160 | 763 |
| | | | | | | | | 825 | | 66 | 648 | 170 | 185 | 186 | 745 |
| | | | | | | | | 14 | | 773 | 191 | 669 | 654 | 653 | 94 |
| | | | | | | | | | | 53 | 718 | 87 | 639 | 167 | 737 |
| | | | | | | | | | | 786 | 121 | 752 | 200 | 672 | 102 |
| | | | | | | | | | | 10 | 141 | 670 | 114 | 760 | 90 |
| | | | | | | | | | | 829 | 698 | 169 | 725 | 79 | 749 |
| | | | | | | | | | | 9 | 149 | 751 | 189 | 754 | 109 |
| | | | | | | | | | | 830 | 690 | 88 | 650 | 85 | 730 |
| | | | | | | | | | | | 623 | 107 | 724 | 77 | 165 |
| | | | | | | | | | | | 216 | 732 | 115 | 762 | 674 |
| | | | | | | | | | | | 218 | 758 | 194 | 92 | 728 |
| | | | | | | | | | | | 621 | 81 | 645 | 747 | 111 |
| | | | | | | | | | | | | 82 | 195 | 781 | 209 |
| | | | | | | | | | | | | 757 | 644 | 58 | 630 |
| | | | | | | | | | | | | 100 | 647 | 62 | 204 |
| | | | | | | | | | | | | 739 | 192 | 111 | 635 |
| | | | | | | | | | | | | 98 | 182 | 69 | 117 |
| | | | | | | | | | | | | 741 | 657 | 770 | 722 |
| | | | | | | | | | | | | 768 | 682 | 54 | 651 |
| | | | | | | | | | | | | 71 | 157 | 785 | 188 |
| | | | | | | | | | | | | 59 | 156 | 803 | 680 |
| | | | | | | | | | | | | 780 | 683 | 36 | 159 |
| | | | | | | | | | | | | 65 | 211 | 807 | 198 |
| | | | | | | | | | | | | 774 | 628 | 32 | 641 |
| | | | | | | | | | | | | 789 | 154 | 25 | 113 |
| | | | | | | | | | | | | 50 | 685 | 814 | 726 |
| | | | | | | | | | | | | 49 | 716 | 821 | 656 |
| | | | | | | | | | | | | 790 | 123 | 18 | 183 |
| | | | | | | | | | | | | 813 | 700 | 828 | 659 |
| | | | | | | | | | | | | 26 | 139 | 11 | 180 |
| | | | | | | | | | | | | 822 | 212 | 835 | 177 |
| | | | | | | | | | | | | 17 | 627 | 4 | 662 |
| | | | | | | | | | | | | 826 | 686 | | 643 |
| | | | | | | | | | | | | 13 | 153 | | 196 |
| | | | | | | | | | | | | 6 | 213 | | 155 |
| | | | | | | | | | | | | 833 | 626 | | 684 |
| | | | | | | | | | | | | | 215 | | 625 |
| | | | | | | | | | | | | | 624 | | 214 |
| | | | | | | | | | | | | | 689 | | 126 |
| | | | | | | | | | | | | | 150 | | 713 |
| | | | | | | | | | | | | | | | 708 |
| | | | | | | | | | | | | | | | 131 |
| | | | | | | | | | | | | | | | 219 |
| | | | | | | | | | | | | | | | 620 |
| | | | | | | | | | | | | | | | 617 |
| | | | | | | | | | | | | | | | 222 |
| | | | | | | | | | | | | | | | 613 |
| | | | | | | | | | | | | | | | 226 |

TABLE 1-continued

| SG1 | SG2 | SG3 | SG4 | SG5 | SG6 | SG7 | SG8 | SG9 | SG10 | SG11 | SG12 | SG13 | SG14 | SG15 | SG16 |
|---|---|---|---|---|---|---|---|---|---|---|---|---|---|---|---|
| high cubic metric group ||||||||||||||||
| 609 | 323 | 237 | 509 | 257 | 346 | 608 | 546 | 242 | 317 | 603 | 484 | 604 | 530 | 367 | 503 |
| 230 | 516 | 602 | 330 | 582 | 493 | 231 | 293 | 597 | 522 | 236 | 355 | 235 | 309 | 472 | 336 |
| 232 | 320 | 600 | 338 | 566 | 500 | 260 | 288 | 274 | 307 | 303 | 434 | 572 | 265 | 296 | 534 |
| 607 | 519 | 239 | 501 | 273 | 339 | 579 | 551 | 565 | 532 | 536 | 405 | 267 | 574 | 543 | 305 |
| 577 | 334 | 244 | 498 | 584 | 351 | 268 | 284 | 402 | 553 | 356 | 435 | 302 | 233 | | 466 |
| 262 | 505 | 595 | 341 | 255 | 488 | 571 | 555 | 437 | 286 | 483 | 404 | 537 | 606 | | 373 |
| 587 | 359 | 243 | 499 | 254 | 306 | 563 | 471 | 383 | 552 | | 433 | | | | 280 |
| 252 | 480 | 596 | 340 | 585 | 533 | 276 | 368 | 456 | 287 | | 406 | | | | 559 |
| 418 | 544 | 275 | 497 | 245 | 550 | 430 | 253 | 482 | 573 | | | | | | 560 |
| 421 | 295 | 564 | 342 | 594 | 289 | 409 | 586 | 357 | 266 | | | | | | 279 |
| 416 | 454 | 561 | 301 | 588 | 439 | 398 | 583 | 510 | 578 | | | | | | 419 |
| 423 | 385 | 278 | 538 | 251 | 400 | 441 | 256 | 329 | 261 | | | | | | 420 |
| 426 | 292 | 589 | 366 | 412 | 461 | 549 | 263 | | | | | | | | 240 |
| 413 | 547 | 250 | 473 | 427 | 378 | 290 | 576 | | | | | | | | 599 |
| 428 | 291 | 246 | 401 | 467 | 465 | 535 | | | | | | | | | 258 |
| 411 | 548 | 593 | 438 | 372 | 374 | 304 | | | | | | | | | 581 |
| 463 | 381 | 417 | 468 | 557 | 415 | 308 | | | | | | | | | 610 |
| 376 | 458 | 422 | 371 | 282 | 424 | 531 | | | | | | | | | 229 |
| 444 | 399 | 248 | 408 | 436 | 569 | 358 | | | | | | | | | |
| 395 | 440 | 591 | 431 | 403 | 270 | 481 | | | | | | | | | |
| 283 | 380 | 445 | 464 | 396 | 598 | 316 | | | | | | | | | |
| 556 | 459 | 394 | 375 | 443 | 241 | 523 | | | | | | | | | |
| 285 | 442 | 393 | 249 | 447 | | | | | | | | | | | |
| 554 | 397 | 446 | 590 | 392 | | | | | | | | | | | |
| 379 | 470 | 370 | 269 | 448 | | | | | | | | | | | |
| 460 | 369 | 469 | 570 | 391 | | | | | | | | | | | |
| 449 | 462 | 365 | 238 | 457 | | | | | | | | | | | |
| 390 | 377 | 474 | 601 | 382 | | | | | | | | | | | |
| 363 | 429 | 300 | 605 | 389 | | | | | | | | | | | |
| 476 | 410 | 539 | 234 | 450 | | | | | | | | | | | |
| 455 | 407 | 299 | | 294 | | | | | | | | | | | |
| 384 | 432 | 540 | | 545 | | | | | | | | | | | |
| 451 | 281 | 475 | | 542 | | | | | | | | | | | |
| 388 | 558 | 364 | | 297 | | | | | | | | | | | |
| 386 | 425 | 362 | | 528 | | | | | | | | | | | |
| 453 | 414 | 477 | | 311 | | | | | | | | | | | |
| 478 | 592 | 541 | | 344 | | | | | | | | | | | |
| 361 | 247 | 298 | | 495 | | | | | | | | | | | |
| 452 | 562 | 527 | | 345 | | | | | | | | | | | |
| 387 | 277 | 312 | | 494 | | | | | | | | | | | |
| 360 | 568 | 313 | | 318 | | | | | | | | | | | |
| 479 | 271 | 526 | | 521 | | | | | | | | | | | |
| 529 | 272 | 525 | | 331 | | | | | | | | | | | |
| 310 | 567 | 314 | | 508 | | | | | | | | | | | |
| 485 | 264 | 353 | | 514 | | | | | | | | | | | |
| 354 | 575 | 486 | | 325 | | | | | | | | | | | |
| 511 | 580 | 487 | | 321 | | | | | | | | | | | |
| 328 | 259 | 352 | | 518 | | | | | | | | | | | |
| 524 | | 343 | | | | | | | | | | | | | |
| 315 | | 496 | | | | | | | | | | | | | |
| 337 | | 512 | | | | | | | | | | | | | |
| 502 | | 327 | | | | | | | | | | | | | |
| 349 | | 350 | | | | | | | | | | | | | |
| 490 | | 489 | | | | | | | | | | | | | |
| 504 | | 326 | | | | | | | | | | | | | |
| 335 | | 513 | | | | | | | | | | | | | |
| 515 | | 319 | | | | | | | | | | | | | |
| 324 | | 520 | | | | | | | | | | | | | |
| | | 332 | | | | | | | | | | | | | |
| | | 507 | | | | | | | | | | | | | |
| | | 506 | | | | | | | | | | | | | |
| | | 333 | | | | | | | | | | | | | |
| | | 491 | | | | | | | | | | | | | |
| | | 348 | | | | | | | | | | | | | |
| | | 492 | | | | | | | | | | | | | |
| | | 347 | | | | | | | | | | | | | |
| | | 517 | | | | | | | | | | | | | |
| | | 322 | | | | | | | | | | | | | |

After the above sequencing process is completed, the mapping relation between the sequence indices and the serial numbers of the ZC sequences can be obtained. As to a practical system, the mapping relation can be stored in the memories of a mobile phone and a base station. After the base station informs, via the BCH channel, the mobile phone the sequence index, the mobile phone can find the serial number of the ZC sequence corresponding to the index according to the mapping relation, and then generate usable ZCZ sequences according to the step length of cyclic shift and the cyclic shift limitation rule. If the number of the ZCZ sequences is smaller than 64, the mobile phone increments the index, and continuously generates ZCZ sequences using the next ZC sequence until the total number of the ZCZ sequences reaches 64. Finally, the mobile phone randomly selects one sequence from all the generated ZCZ sequences as a preamble to be sent.

Figure 7:
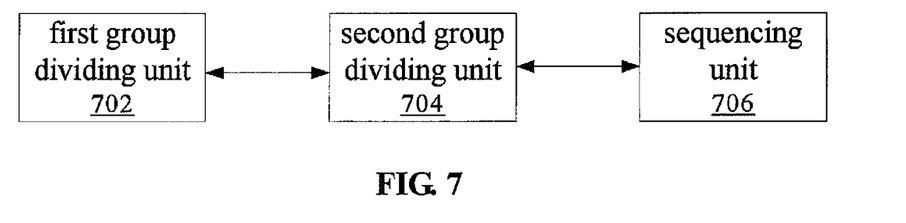
FIG. 7 is a block diagram of the device for sequencing the ZC sequences of the random access channel according to an embodiment of the present invention.

The device for sequencing the ZC sequences of the random access channel according to an embodiment of the present invention is described with reference to FIG. 7. As shown in FIG. 7, the device for sequencing the ZC sequences of the to random access channel comprises: a first group dividing unit 702, configured to divide Nq ZC sequences into a plurality of groups according to the cubic metrics of the ZC sequences of the random access channel; a second group dividing unit 704, configured to sequence the ZC sequences within each group to form some sub-groups according to the maximum cyclic shift supported by the ZC sequences under high speed circumstance; and a sequencing unit 706, configured to sequence the ZC sequences in each of the plurality of sub-groups according to the cubic metrics of the ZC sequences, wherein, the adjacent sub-groups in the same group are sequenced in different orders, while the sub-groups at the boundary of the two adjacent groups are sequenced in the same order.

Wherein, the first group dividing unit divides the Nq ZC sequences into G groups, wherein, $1 \leq G \leq Nq$, the relation between the serial number of each group and the cubic metrics of the ZC sequences in each group is: the cubic metrics of the ZC sequences in Group i is smaller than the cubic metrics of the ZC sequences in Group i+1, or the cubic metrics of the ZC sequences in Group i is larger than the cubic metrics of the ZC sequences in Group i+1. Specifically, the first group dividing unit divides the Nq ZC sequences into two groups using the cubic metrics of Quadrature Phase Shift Keying as a threshold.

Wherein, the second group dividing unit divides the ZC sequences in each sub-group into a plurality of sub-groups according to one of the following principles: the maximum cyclic shift supported by the ZC sequences in Sub-group i under the high speed circumstance is smaller than the maximum cyclic shift supported by the ZC sequences in Sub-group i+1 under the high speed circumstance, the maximum cyclic shift supported by the ZC sequences in Sub-group i under the high speed circumstance is larger than the maximum cyclic shift supported by the ZC sequences in Sub-group i+1 under the high speed circumstance, wherein, the second group dividing unit applies different principles to the sub-groups in adjacent groups.

Wherein, the sequencing process of the second group dividing unit may be performed in the increasing order or in the decreasing order, and the adjacent groups should be sequenced in different orders.

Wherein, the sequencing process of the second group dividing unit needs to be performed according to a certain granularity. The granularity of the cyclic shift of Group g is $P^g=\{P_1^g, P_2^g, \ldots, P_s^g\}$ and $P_i^g < P_{i+1}^g$, thus, (1) the sequencing performed in the increasing order means: when $1<i<s$, the maximum cyclic shift supported by each sequence in Sub-group i under the high speed circumstance is smaller than $P_{i+1}^g$, and larger than or equal to $P_i^g$, when i=1, the maximum cyclic shift supported by each sequence in Sub-group i under the high speed circumstance is larger than or equal to $P_s^g$; (2) the sequencing performed in the decreasing order means: when $1<i<s$, the maximum cyclic shift supported by each sequence in Sub-group i under the high speed circumstance is smaller than $P_{s-i+2}^g$, and larger than or equal to $P_{s-i+1}^g$, when i=1, the maximum cyclic shift supported by each sequence in Sub-group i under the high speed circumstance is larger than or equal to $P_s^g$, when i=s, the maximum cyclic shift supported by each sequence in Sub-group i under the high speed circumstance is smaller than $P_1^g$.

Wherein, the maximum cyclic shift of the ZC sequences is $N_{CS}=\min(du, N_{ZC}-2 \cdot du)$ wherein, du is the distance between a correlation peak and a correlation peak alias thereof, and $N_{ZC}$ is the length of the ZC sequence. The distance between the correlation peak and the correlation peak alias thereof is $$du = \begin{cases} \dfrac{m \cdot N_{ZC} - 1}{u}, & \text{when } \dfrac{m \cdot N_{ZC} - 1}{u} \leq \text{floor}(N/2) \\ N_{ZC} - \dfrac{m \cdot N_{ZC} - 1}{u}, & \text{when } \dfrac{m \cdot N_{ZC} - 1}{u} > \text{floor}(N/2) \end{cases},$$

wherein, u is the serial number of the ZC sequence, and m is the minimum positive integer which makes $$\dfrac{m \cdot N_{ZC} - 1}{u}$$

a positive integer. Wherein, the sequence dividing unit can divide a plurality of ZC sequences, being sequenced after the first sequencing, into two groups according to the cubic metrics of Quadrature Phase Shift Keying.

The descriptions above are only preferable embodiments of the present invention, which are not used to restrict the present invention. For those skilled in to the art, the present invention may have various changes and variations. Any amendments, equivalent substitutions, improvements etc. within the spirit and principle of the present invention are all included in the scope of the claims of the present invention.

What is claimed is:

1. A method for sequencing Zadoff-Chu (ZC) sequences of random access channel, comprising the following steps:
    Step 202, dividing, by a first group dividing unit, Nq ZC sequences into a plurality of groups according to a cubic metrics of the ZC sequences, wherein $1<=Nq<=Nzc-1$, Nzc is the length of the ZC sequence;
    Step 204, sequencing, by a second group dividing unit, the ZC sequences, according to a maximum cyclic shift supported by the ZC sequences under a high speed circumstance, within each group to form a plurality of sub-groups; and
    Step 206, sequencing, by a sequencing unit, the ZC sequences within each of said plurality of sub-groups according to the cubic metrics of the ZC sequences, wherein, adjacent sub-groups in the same group are sequenced in different orders, while the sub-groups at the boundary of two adjacent groups are sequenced in the same order;
    wherein, said maximum cyclic shift $N_{CS}=\min(du, N_{ZC}-2 \cdot du)$, wherein, du is the distance between a correlation peak and a correlation peak alias thereof, and $N_{ZC}$ is the length of said ZC sequence.

2. The method for sequencing the ZC sequences of the random access channel according to claim 1, wherein, said Nq ZC sequences are divided into G groups, wherein, $1 \leq G \leq Nq$, the relation between the serial number of each of said plurality of groups and the cubic metrics of the ZC sequences in each of said plurality of groups is: the cubic metrics of the ZC sequences in Group i are smaller than the cubic metrics of the ZC sequences in Group i+1, or the cubic metrics of the ZC sequences in Group i are larger than the cubic metrics of the ZC sequences in Group i+1.

3. The method for sequencing the ZC sequences of the random access channel according to claim 1, wherein, said Nq ZC sequences are divided into two groups according to the cubic metrics of Quadrature Phase Shift Keying.

4. The method for sequencing the ZC sequences of the random access channel according to claim 1, wherein, in Step 202, firstly, said Nq ZC sequences are sequenced, in decreasing order or in increasing order, according to the cubic metrics of the ZC sequences, and then, a sequencing result is divided into a plurality of groups according to one or more cyclic shift thresholds.

5. The method for sequencing the ZC sequences of the random access channel according to claim 1, wherein, in Step 204, the sequencing is performed in increasing order or in decreasing order, and the adjacent groups are sequenced in different orders.

6. The method for sequencing the ZC sequences of the random access channel according to claim 1, wherein, in Step 204, the sequencing is performed according to a preset granularity.

7. The method for sequencing the ZC sequences of the random access channel according to claim 5, wherein, a granularity of the cyclic shift of Group g is $P^g = \{P_1^g, P_2^g, \ldots, P_s^g\}$, and $P_i^g < P_{i+1}^g$, and the sequencing performed in the increasing order means: when $1 < i < s$, the maximum cyclic shift supported by each ZC sequence in Sub-group i under the high speed circumstance is smaller than $P_{i+1}^g$, and larger than or equal to $P_i^g$, when i=1, the maximum cyclic shift supported by each ZC sequence in Sub-group i under the high speed circumstance is smaller than $P_1^g$, when i=s, the maximum cyclic shift supported by each ZC sequence in Sub-group i under the high speed circumstance is larger than or equal to $P_s^g$, and the sequencing performed in the decreasing order means: when $1 < i < s$, the maximum cyclic shift supported by each ZC sequence in Sub-group i under the high speed circumstance is smaller than $P_{s-i+2}^g$, and larger than or equal to $P_{s-i+1}^g$, when i=1, the maximum cyclic shift supported by each ZC sequence in Sub-group i under the high speed circumstance is larger than or equal to $P_s^g$, when i=s, the maximum cyclic shift supported by each ZC sequence in Sub-group i under the high-speed circumstance is smaller than $P_1^g$.

8. The method for sequencing the ZC sequences of the random access channel according to claim 1, wherein, said distance between the correlation peak and the correlation peak alias thereof is $$du = \begin{cases} \dfrac{m \cdot N_{ZC} - 1}{u}, & \text{when } \dfrac{m \cdot N_{ZC} - 1}{u} \leq \text{floor}(N/2) \\ N_{ZC} - \dfrac{m \cdot N_{ZC} - 1}{u}, & \text{when } \dfrac{m \cdot N_{ZC} - 1}{u} > \text{floor}(N/2) \end{cases},$$

wherein, u is the serial number of said ZC sequence, and m is the minimum positive integer which makes $$\dfrac{m \cdot N_{ZC} - 1}{u}$$

a positive integer.

9. The method for sequencing the ZC sequences of the random access channel according to claim 2, wherein, said maximum cyclic shift $N_{CS} = \min(du, N_{ZC} - 2 \cdot du)$ wherein, du is the distance between a correlation peak and a correlation peak alias thereof, and $N_{ZC}$ is the length of said ZC sequence.

10. The method for sequencing the ZC sequences of the random access channel according to claim 3, wherein, said maximum cyclic shift $N_{CS} = \min(du, N_{ZC} - 2 \cdot du)$ wherein, du is the distance between a correlation peak and a correlation peak alias thereof, and $N_{ZC}$ is the length of said ZC sequence.

11. A device for sequencing Zadoff-Chu (ZC) sequences of random access channel comprising:
a first group dividing unit, configured to divide Nq ZC sequences into a plurality of groups according to a cubic metrics of the ZC sequences of the random access channel, wherein $1 <= Nq <= Nzc-1$, Nzc is the length of the ZC sequence;
a second group dividing unit, configured to sequence the ZC sequences within each group to form a plurality of sub-groups, according to the maximum cyclic shift supported by the ZC sequences under a high speed circumstance; and
a sequencing unit, configured to sequence the ZC sequences in each of said plurality of sub-groups according to the cubic metrics of the ZC sequences, wherein, adjacent sub-groups in the same group are sequenced in different orders, while the sub-groups at the boundary of two adjacent groups are sequenced in the same order;
wherein, said maximum cyclic shift $N_{CS} = \min(du, N_{ZC} - 2 \cdot du)$, wherein, du is the distance between a correlation peak and a correlation peak alias thereof, and $N_{ZC}$ is the length of said ZC sequence.

12. The device for sequencing the ZC sequences of the random access channel according to claim 11, wherein, said first group dividing unit divides said Nq ZC sequences into G groups, wherein, $1 \leq G \leq Nq$, the relation between the serial number of each of said plurality of groups and the cubic metrics of the ZC sequences in each of said plurality of groups is: the cubic metrics of the ZC sequences in Group i are smaller than the cubic metrics of the ZC sequences in Group i+1, or the cubic metrics of the ZC sequences in Group i are larger than the cubic metrics of the ZC sequences in Group i+1.

13. The device for sequencing the ZC sequences of the random access channel according to claim 11, wherein, said first group dividing unit divides said Nq ZC sequences into two groups using the cubic metrics of Quadrature Phase Shift Keying as a threshold.

14. The device for sequencing the ZC sequences of the random access channel according to claim 11, wherein, said second group dividing unit performs the sequencing of the ZC sequences in each group in increasing order or in decreasing order, and the adjacent groups are sequenced in different orders.

15. The device for sequencing the ZC sequences of the random access channel according to claim 11, wherein, said second group dividing unit performs the sequencing according to a preset granularity.

16. The device for sequencing the ZC sequences of the random access channel according to claim 14, wherein, a granularity of the cyclic shift of Group g is $P^g = \{P_1^g, P_2^g, \ldots, P_s^g\}$, and $P_i^g < P_{i+1}^g$, performing the sequencing in the increasing order means: when $1 < i < s$, the maximum cyclic shift supported by each sequence in Sub-group i under the high speed circumstance is smaller than $P_{i+1}^g$, and larger than or equal to $P_i^g$, when i=1, the maximum cyclic shift supported by each sequence in Sub-group i under the high speed g circumstance is smaller than $P_1^g$, when i=s, the maximum cyclic shift supported by each sequence in Sub-group i under the high speed circumstance is larger than or equal to $P_s^g$, performing the sequencing in the decreasing order means: when $1 < i < s$, the maximum cyclic shift supported by each sequence in Sub-group i under the high speed circumstance is smaller than $P_{s-i+2}^g$, and larger than or equal to $P_{s-i+1}^g$, when i=1, the maximum cyclic shift supported by each sequence in Sub-group i under the high speed circumstance is larger than or equal to $P_s^g$, when i=s, the maximum cyclic shift supported by each sequence in Sub-group i under the high speed circumstance is smaller than $p_1^g$.

17. The device for sequencing the ZC sequences of the random access channel according to claim 11, wherein, said distance between the correlation peak and the correlation peak alias thereof is $$du = \begin{cases} \dfrac{m \cdot N_{ZC} - 1}{u}, & \text{when } \dfrac{m \cdot N_{ZC} - 1}{u} \leq \text{floor}(N/2) \\ N_{ZC} - \dfrac{m \cdot N_{ZC} - 1}{u}, & \text{when } \dfrac{m \cdot N_{ZC} - 1}{u} > \text{floor}(N/2) \end{cases},$$

wherein, u is the serial number of said ZC sequence, and m is the minimum positive integer which makes $$\dfrac{m \cdot N_{ZC} - 1}{u}$$

a positive integer.

18. The device for sequencing the ZC sequences of the random access channel according to claim 12, wherein, said maximum cyclic shift $N_{CS}$=min(du, $N_{ZC}$−2·du) wherein, du is the distance between a correlation peak and a correlation peak alias thereof, and $N_{ZC}$ is the length of said ZC sequence.

* * * * *